United States Patent
Wei et al.

(10) Patent No.: US 7,940,022 B2
(45) Date of Patent: May 10, 2011

(54) MOTOR CONTROLLING DEVICE AND METHOD THEREOF

(75) Inventors: Chia-Pin Wei, Taoyuan Hsien (TW); Chien-Sheng Lin, Taoyuan Hsien (TW); Yen-Hung Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 461 days.

(21) Appl. No.: 12/115,793

(22) Filed: May 6, 2008

(65) Prior Publication Data

US 2009/0001916 A1   Jan. 1, 2009

(30) Foreign Application Priority Data

Jun. 29, 2007   (TW) ................................ 96123703 A

(51) Int. Cl.
*H02P 7/29*   (2006.01)
(52) U.S. Cl. ......................... 318/461; 318/474; 318/484

(58) Field of Classification Search .................. 318/268, 318/430, 431, 461, 474–477, 452, 478, 479, 318/484
See application file for complete search history.

(56) References Cited

U.S. PATENT DOCUMENTS

| | | | | |
|---|---|---|---|---|
| 4,359,676 A | * | 11/1982 | Fujioka | 318/653 |
| 4,598,240 A | * | 7/1986 | Gale et al. | 318/400.11 |
| 7,459,876 B2 | * | 12/2008 | Chiu et al. | 318/702 |
| 7,606,514 B2 | * | 10/2009 | Sakai | 399/167 |

* cited by examiner

*Primary Examiner* — Bentsu Ro
(74) *Attorney, Agent, or Firm* — Muncy, Geissler, Olds & Lowe, PLLC

(57) ABSTRACT

A motor controlling device and a motor controlling method are provided. The motor controlling device includes a first sensor, a second sensor and a signal switching circuit. The signal switching circuit is electrically connected to the first and second sensors, respectively. The signal switching circuit is switched to the first sensor to output a first switching phase signal to drive a motor when the motor starts to operate. The signal switching circuit is switched to the second sensor to output a second switching phase signal to drive the motor when a predetermined switching condition is satisfied with a predetermined value during the motor operation.

17 Claims, 7 Drawing Sheets

MOTOR CONTROLLING DEVICE AND METHOD THEREOF

BACKGROUND OF THE INVENTION

1. Field of the Invention

The present invention relates to a motor controlling device and method, and more particularly to a motor controlling device and method for providing different switching phase signals during different stages of motor operation to enhance the motor starting capability and operating efficiency.

2. Description of the Related Art

FIG. 1 shows a conventional motor controlling device 1. The Hall sensor 12 of the motor controlling device 1 is used for detecting a switching phase signal generated by a motor 2 during operation. The motor driving circuit 11 of the motor controlling device 1 is electrically connected to the Hall sensor 12, and is used for receiving the switching phase signal from the Hall sensor 12 to generate a motor rotating speed controlling signal. After the motor rotating speed controlling signal generated by the motor driving circuit 11 is sent to the coil switching circuit 13, the coil switching circuit 13 will send the motor rotating speed controlling signal to a coil set 211 of the motor 2 in sequence, such that the coil set 211 can switch the current direction between two adjoining phases to achieve continuous operation of the motor 2. In addition, a pulse width modulation (PWM) generating circuit 14 is used for controlling a rotating speed of the motor 2.

Referring to FIG. 2A, the conventional motor 2 is composed of a stator 21 and a rotor 22. The majority of controlling methods of the motor 2 is using a single Hall sensor 12 to detect the switching phase signal of the motor 2 and output the switching phase signal to the motor driving circuit 11 to drive the motor 2. The Hall sensor 12 is disposed on the stator 21 of the motor 2 for detecting the N or S poles of the rotor 22 which passes through and then the Hall sensor 12 outputs a signal to change the current direction of the coil set 211 of the stator 21, such that the stator 21 can change the polarity of the silicon steel plates 212 and 213 in response to the rotor 22.

The Hall sensor 12 outputs a high level signal when detecting the N pole of the rotor 22, and the polarity of the silicon steel plate 212, where the Hall sensor 12 is located, is changed to N pole, such that the rotor 22 is continuously operating by a repulsive force from the N pole to the silicon steel plate 212. On the other hand, the Hall sensor 12 outputs a low level signal when detecting the S pole of the rotor 22, and the polarity of the silicon steel plate 212 is changed to S pole, wherein the operating principle is the same as previously described. However, if a boundary between the N and S poles of the rotor 22 is within a sensing range of the Hall sensor 12, the motor 2 falls into a dead angle. The boundary between the N and S poles of the rotor 22 is determined by a magnetic polarity of the rotor 22.

Therefore, in order to avoid an operational dead angle of the motor 2, one of the typical methods is disposing the Hall sensor 12 on a circuit board 10 and making the Hall sensor 12 to be located in an intermediate zone of the two pole silicon steel plates 212 and 213 of the stator 21, as shown in FIG. 2A. Although this method can provide a switching phase signal without the operational dead angle to the motor driving circuit 11, the method males the maximum efficiency of the motor 2 difficult to control.

Further, referring to FIG. 2B, in order to solve such low efficiency problem, another method is used wherein a location is found with the best efficiency through testing the circuit board 10 between two pole silicon steel plates 212 and 213 of the stator 21, and the Hall sensor 12 is disposed in the location. Although this method can enhance operational efficiency, the operational dead angle still exists.

BRIEF SUMMARY OF THE INVENTION

This present invention discloses two Hall sensors disposed in an intermediate zone between two silicon steel plates of the stator of the motor. A phase signal (without the operational dead angle) output by one of the Hall sensors is provided to drive the motor during the initial operating stage of the motor. Another Hall sensor is switched to output an advanced phase signal (high efficiency) when the motor is operated and the predetermined switching condition is satisfied so as to obtain a high efficiency motor without an operational dead angle.

Thus, a motor controlling device is provided. An exemplary embodiment of such motor controlling device includes a first sensor, a second sensor, a signal switching circuit, a motor driving circuit and a coil switching circuit. The first sensor detects a switching phase signal generated by a motor and obtains a first switching phase signal corresponding to the switching phase signal. The second sensor detects the switching phase signal generated by the motor and obtains a second switching phase signal corresponding to the switching phase signal. The signal switching circuit is electrically connected to the first sensor and the second sensor, respectively. The signal switching circuit is switched to the first sensor to output the first switching phase signal when the motor starts to operate, and the signal switching circuit is switched to the second sensor to output the second switching phase signal when a predetermined switching condition is satisfied during the motor operation.

The motor driving circuit is electrically connected to the signal switching circuit, and the motor driving circuit is used to receive the first switching phase signal or the second switching phase signal which is output by the signal switching circuit so as to generate a motor rotating speed controlling signal, and drive the motor to operate according to the motor rotating speed controlling signal. The coil switching circuit is electrically connected to the motor driving circuit, and the coil switching circuit is used to receive the motor rotating speed controlling signal output by the motor driving circuit, and switch the phases of the motor according to the motor rotating speed controlling signal.

The PWM generating circuit is electrically connected to the motor driving circuit, and the PWM generating circuit is used to modulate the first and second switching phase signals received by the motor driving circuit so as to change a rotating speed of the motor.

The first and second sensors are Hall sensors. Both the first and second switching phase signals include a plurality of continuous and regular square wave signals, and a phase of the second switching phase signal is in advance of a phase of the first switching phase signal. The predetermined switching condition is a predetermined time, rotating speed, rotation number, current or voltage.

The signal switching circuit includes a measuring component and a switch component electrically connected to the measuring component. The measuring component has a predetermined value and the measuring component measures after the motor has been started and outputs a switching signal when an actual value is measured and the measured actual value reaches to the predetermined value. The switch component is switched from the first sensor to the second sensor when receiving the switching signal. The measuring component may be a counter, the predetermined value is a predetermined rotating speed or rotation number, and the actual value is a measured rotating speed or rotation number.

Or, the measuring component may be a timer, the predetermined value is a predetermined time, and the actual value is a counted time.

Or, the measuring component may be a current detecting circuit or a voltage detecting circuit, the predetermined value is a predetermined current or voltage value, and the actual value is a measured current or voltage values Furthermore, a motor controlling method is provided. A first switching phase signal is obtained from a first sensor to drive a motor when the motor starts to operate. A signal switching circuit is switched from the first sensor to a second sensor so as to obtain a second switching signal to drive the motor when a predetermined switching condition is satisfied during the motor operation.

In this method, only one of the first and second switching phase signals is output to drive the motor. In this method, the first and second switching phase signals are obtained by using the first and second sensors to detect the operation of the motor, respectively. A phase of the second switching phase signal is in advance of a phase of the first switching phase signal.

In this method, the predetermined switching condition is a predetermined time, rotating speed, rotation number, current or voltage. In this method, a measuring component of the signal switching circuit begins measuring after the motor starts to operate. The first sensor output is switched to the second sensor output when an actual value, generated by measuring, reaches to a predetermined value.

BRIEF DESCRIPTION OF DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the present invention. This description is made for the purpose of illustrating the general principles of the present invention and should not be taken in a limiting sense. The scope of the present invention is best determined by reference to the appended claims.

Figure 1:
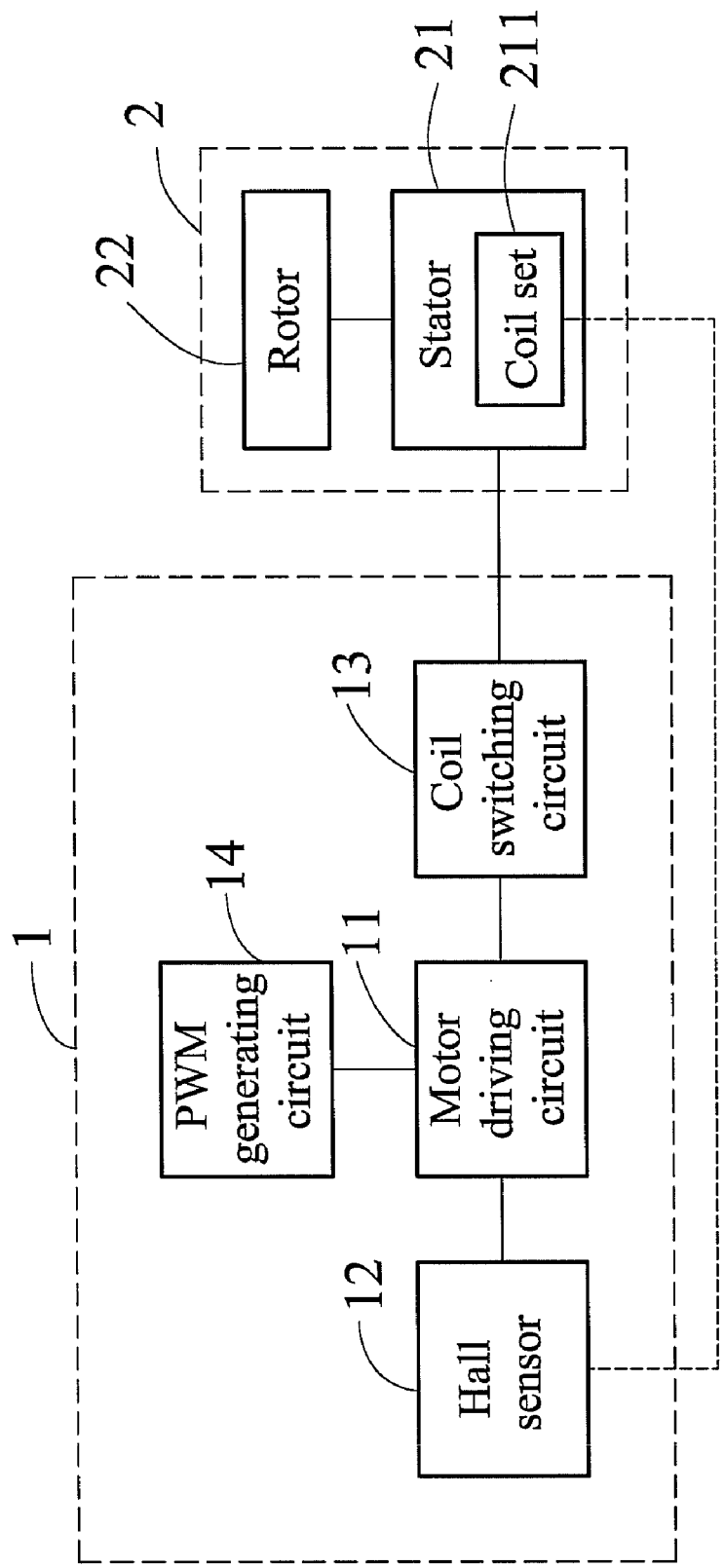
FIG. 1 shows a circuit block diagram of a conventional motor controlling device
Figure 2A:
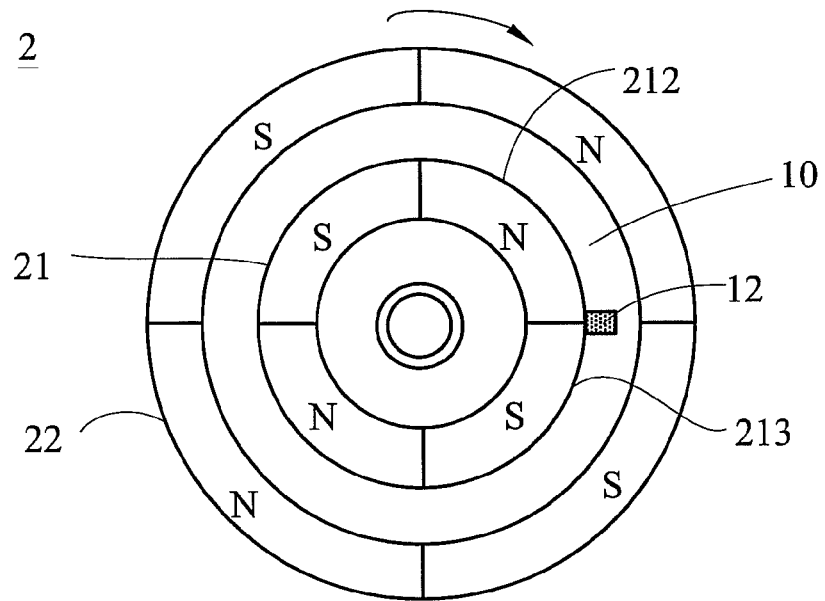
FIGS. 2A and 2B show two location diagrams of a conventional Hall sensor corresponding to the stator of the motor.
Figure 2B:
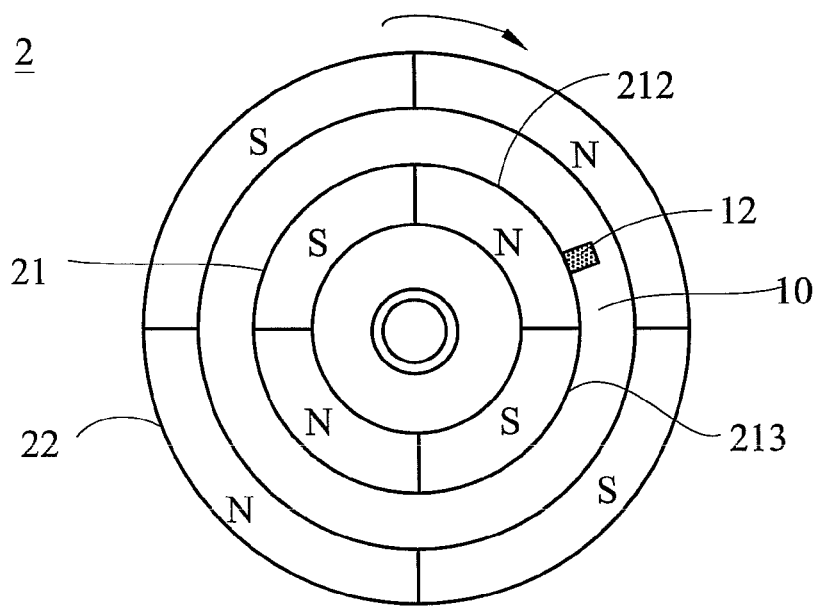
Figure 3:
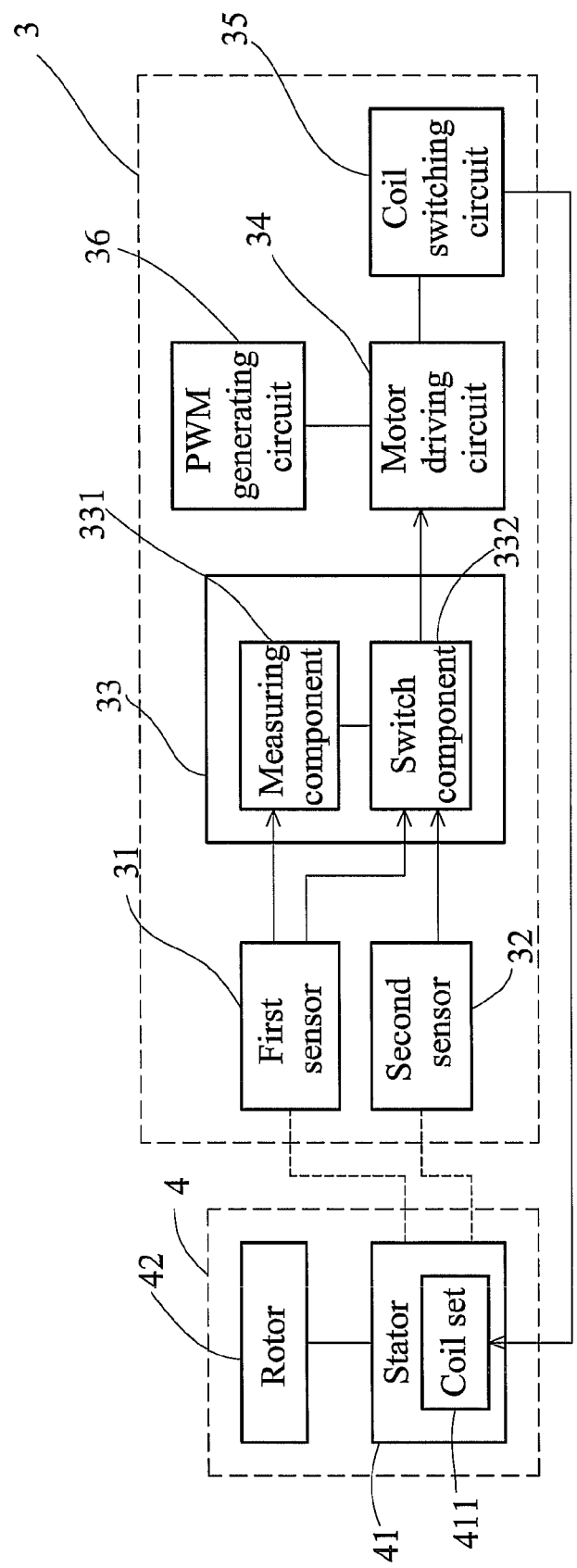
FIG. 3 shows a circuit block diagram of a motor controlling device according to a preferred embodiment of the present invention.
Figure 4:
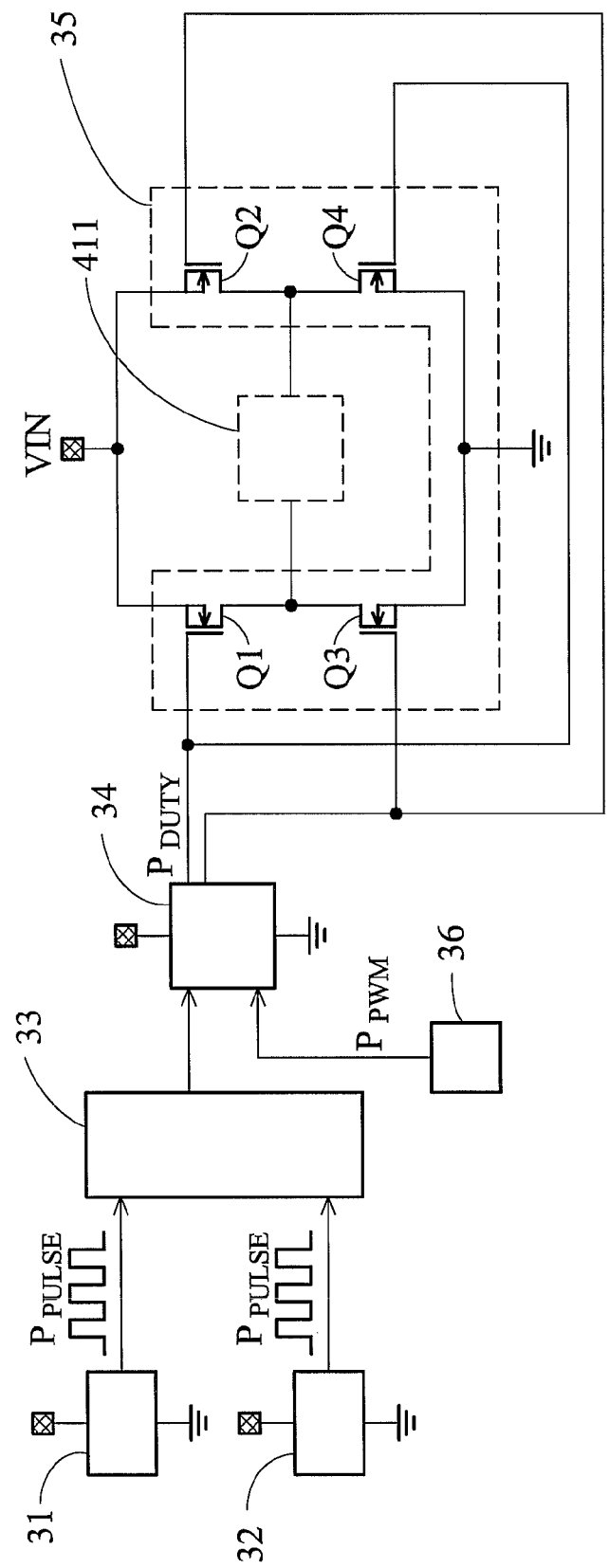
FIG. 4 shows a circuit diagram of a motor controlling device according to a preferred embodiment of the present invention.

FIGS. 3 and 4 show the block and circuit diagrams of a motor controlling device 3 according to a preferred embodiment of the present invention, respectively. The motor controlling device 3 includes a first sensor 31, a second sensor 32, a signal switching circuit 33, a motor driving circuit 34, a coil switching circuit 35 and a PWM generating circuit 36. The motor controlling device 3 is coupled to a coil set 411 of a motor 4, wherein the motor 4 includes a stator 41 and a rotor 42. The stator 41 provides a necessary power to the rotor 42 for rotation. The motor driving circuit 34, the coil switching circuit 35 and the PWM generating circuit 36 are known in the art and will not be described in detail herein.

In the motor controlling device 3 of the present invention, the first and second sensors 31 and 32 are magnetic field sensors, such as a shunt, current transformer, Hall sensor or magnetic resistor and so on. In this embodiment, the first sensor 31 and the second sensor 32 are Hall sensors. The first sensor 31 is used for detecting a first switching phase signal 311 generated by the coil set 411 of the motor 4 during the motor 4 operation, and the second sensor 32 is also used for detecting a second switching phase signal 321 generated by the coil set 411 of the motor 4 during the motor 4 operation, wherein both the first and second switching phase signals 311 and 321 have a plurality of continuous and regular square wave signals.

Figure 5:
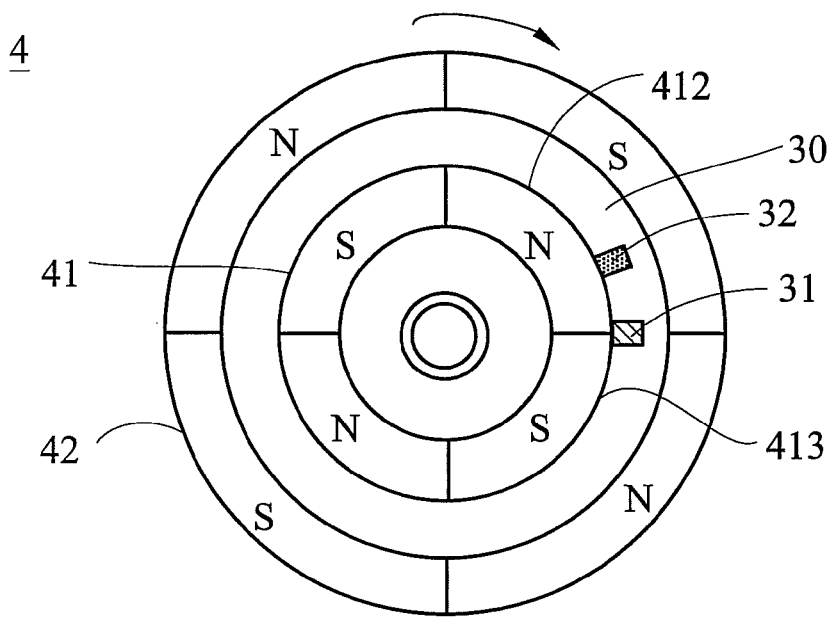
FIG. 5 shows a location diagram of the first and second sensors of a preferred embodiment corresponding to the stator of the motor.

FIG. 5 shows a location diagram of the motor 4 and two Hall sensors (i.e. the first and second sensors 31 and 32). The motor 4 includes the stator 41 and the rotor 42. The rotor 42 has a plurality of magnetic poles (there are four magnetic poles in this embodiment), wherein an arrangement of the N and S poles are staggered. In addition, in this embodiment, the first and second sensors 31 and 32 are disposed on a circuit board 30. In order to avoid that a boundary between the N and S poles of the rotor 42 is detected by the first sensor 31, the first sensor 31 is disposed on the circuit board 30 corresponding to an intermediate zone of two different pole silicon steel plates 412 and 413 of the stator 41, and avoids being disposed in a location (called as an operational dead angle) to effect the rotor 42 (fan) from starting. Moreover, the second sensor 32 is also disposed on the circuit board 30 and located on one side of the first sensor 31, wherein the location is decided by a rotating direction from the rotor 42 to the stator 41 and testing efficiency results.

Figure 6:
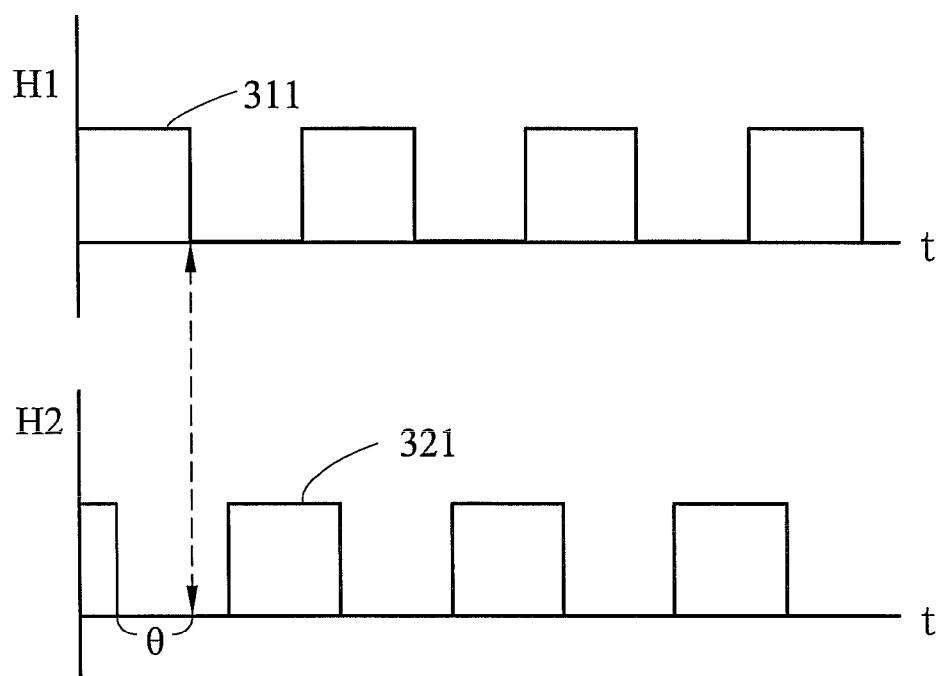
FIG. 6 shows a waveform diagram of the first and second switching phase signals in a preferred embodiment.

As shown in FIG. 6, in this embodiment, in order to allow the phase of the second switching phase signal 321 detected to be in advance of the phase of the first switching phase signal 311, the second sensor 32 is disposed in front of the first sensor 31 with respect to the rotating direction of the rotor 42. The phase of the second switching phase signal 321 detected by the second sensor 32 is in advance of the phase of the first switching phase signal 311 detected by the first sensor 31 when the rotor 42 is rotating and generating an excitation with the silicon steel plate 412 of the stator 41. However, in a usual time sequence, advancing a commutation of the driving time sequence is referred to as a phase leading control. If a phase angle θ is advanced, a performance of the motor 4 is shifted from low speed to high speed, and then the efficiency of the motor 4 is also enhanced. The situation depends on actual testing statuses with regard to how many angles of the phase angle θ has advanced, and then a disposition location of the second sensor 32 is found to obtain the best efficiency of the motor 4.

Figure 7A:
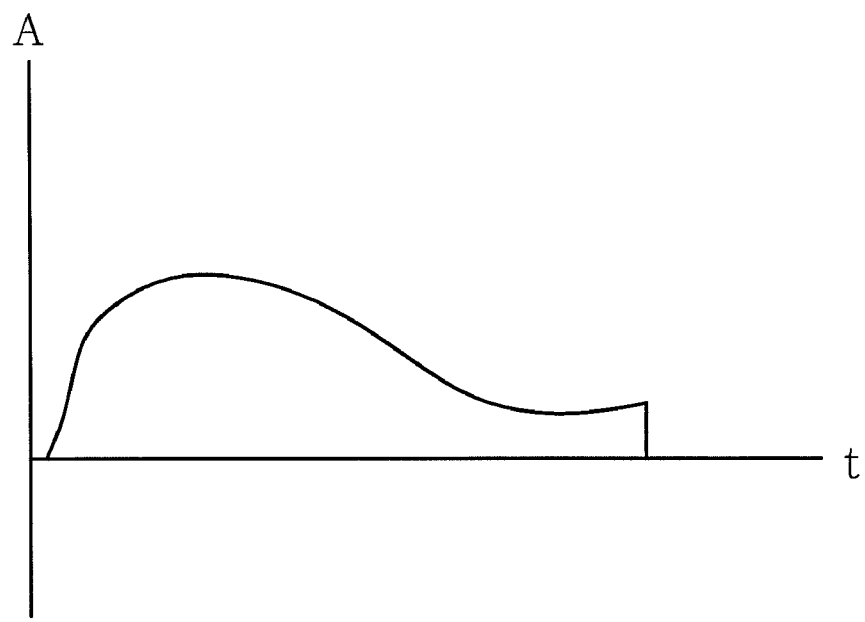
FIGS. 7A and 7B show the current waveform diagrams of a preferred embodiment.
Figure 7B:
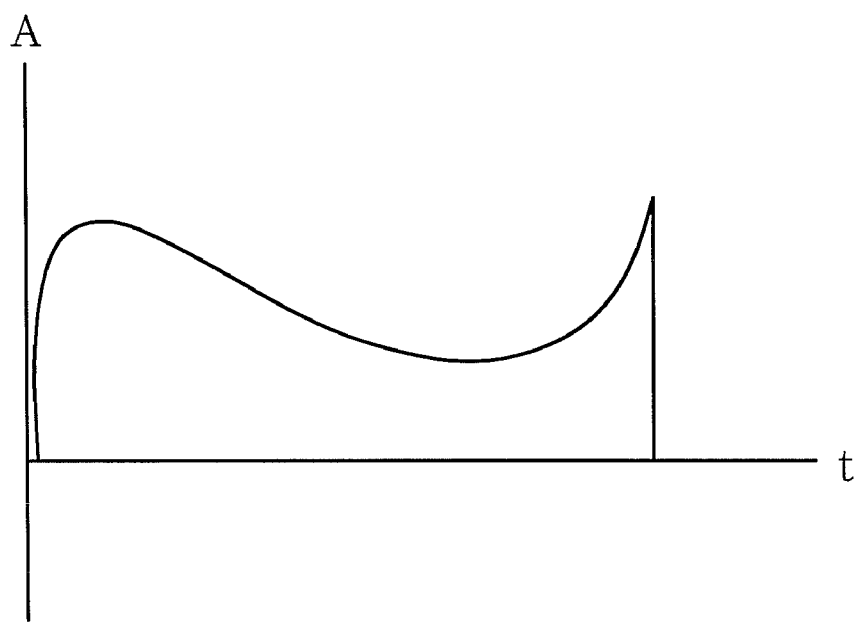

Furthermore, the outputted first switching phase signal 311 can avoid the operational dead angle of the motor 4 due to the first sensor 31 being disposed on the circuit board 30 corresponding to the intermediate zone of two silicon steel plates 412 and 413 of the stator 41. When switching to output the second switching phase signal 321, the phase of the second switching phase signal 321 is in advance of the phase of the first switching phase signal 311 and a phase leading control is formed. Therefore, a current waveform outputted by the motor controlling device 3 of the embodiment is changed from FIG. 7A to FIG. 7B, such that the efficiency of the motor 4 is effectively enhanced.

The signal switching circuit 33 of this embodiment is electrically connected to the first and second sensors 31 and 32. The signal switching circuit 33 includes a measuring component 331 and a switch component 332 electrically connected to the measuring component 331, wherein the measuring component 331 has a predetermined switching condition, which may be a predetermined value of time, rotating speed, rotation number, current or voltage in this embodiment. The measuring component 331 begins measuring when the motor 4 starts to operate, and outputs a switching signal while an actual measured value is satisfied with the predetermined value, which is set in advance. The switch component 332 is switched to the first sensor 31 to output the first switching phase signal 311 when the motor 4 starts to operate, and the switch component 332 is switched from the first sensor 31 to the second sensor 32 to output the second switching phase signal 321 when receiving the switching signal.

The motor driving circuit 34 of this embodiment is electrically connected to the signal switching circuit 33. The motor driving circuit 34 receives the first switching phase signal 311 or the second switching phase signal 321 output from the signal switching circuit 33 to generate a motor rotating speed controlling signal, and drives the motor 4 according to the motor rotating speed controlling signal. The coil switching circuit 35 is electrically connected to the motor driving circuit 34, wherein the coil switching circuit 35 receives the motor rotating speed controlling signal outputted by the motor driving circuit 34 and switches the phase of the coil set 411 of the motor 4 according to the motor rotating speed controlling signal. The PWM generating circuit 36 is electrically connected to the motor driving circuit 34. The PWM generating circuit 36 modulates the first switching phase signal 311 and the second switching phase signal 321 received by the motor driving circuit 34 to change the rotating speed of the motor 4.

The measuring component 331 of the signal switching circuit 33 may be a timer, and the predetermined value of the switching condition can be set as time. Hence, if the motor 4 starts to operate, the signal switching circuit 33 will switch to the first sensor 31 to output the first switching phase signal 311 first. Simultaneously, the timer starts to count time, and then sends the switching signal to the switch component 332 when an actual counted value reaches to the predetermined value of the switching condition (such as a configuration where the signal is switched 30 seconds after the timer has started). The switch component 332 is switched from the first sensor 31 to the second sensor 32 according to the switching signal, and the output is changed from the first switching phase signal 311 to the second switching phase signal 321 and the changed output is sent to the motor driving circuit 34.

Furthermore, the measuring component 331 may also be a counter, and the predetermined value of the switching condition can be set as a rotation number (number of turns) or a rotating speed. The switch component 332 is switched from the first sensor 31 to the second sensor 32 to output the second switching phase signal 321 to the motor driving circuit 34 when an actual counted value of rotation number (rotating speed) of the rotor 42 reaches to the predetermined value of the switching condition (such as a configuration where the signal is switched when the rotating speed is 1000 turns).

Moreover, the measuring component 331 may also be a current detecting circuit or a voltage detecting circuit, and the predetermined value of the switching condition can be set as a current or a voltage. If the actual current or voltage value of the motor driving circuit 34 measured by the current or voltage detecting circuits reaches to the predetermined value of the switching condition, the switch component 332 is switched from the first sensor 31 to the second sensor 32 to output the second switching phase signal 321 to the motor driving circuit 34.

Figure 8:
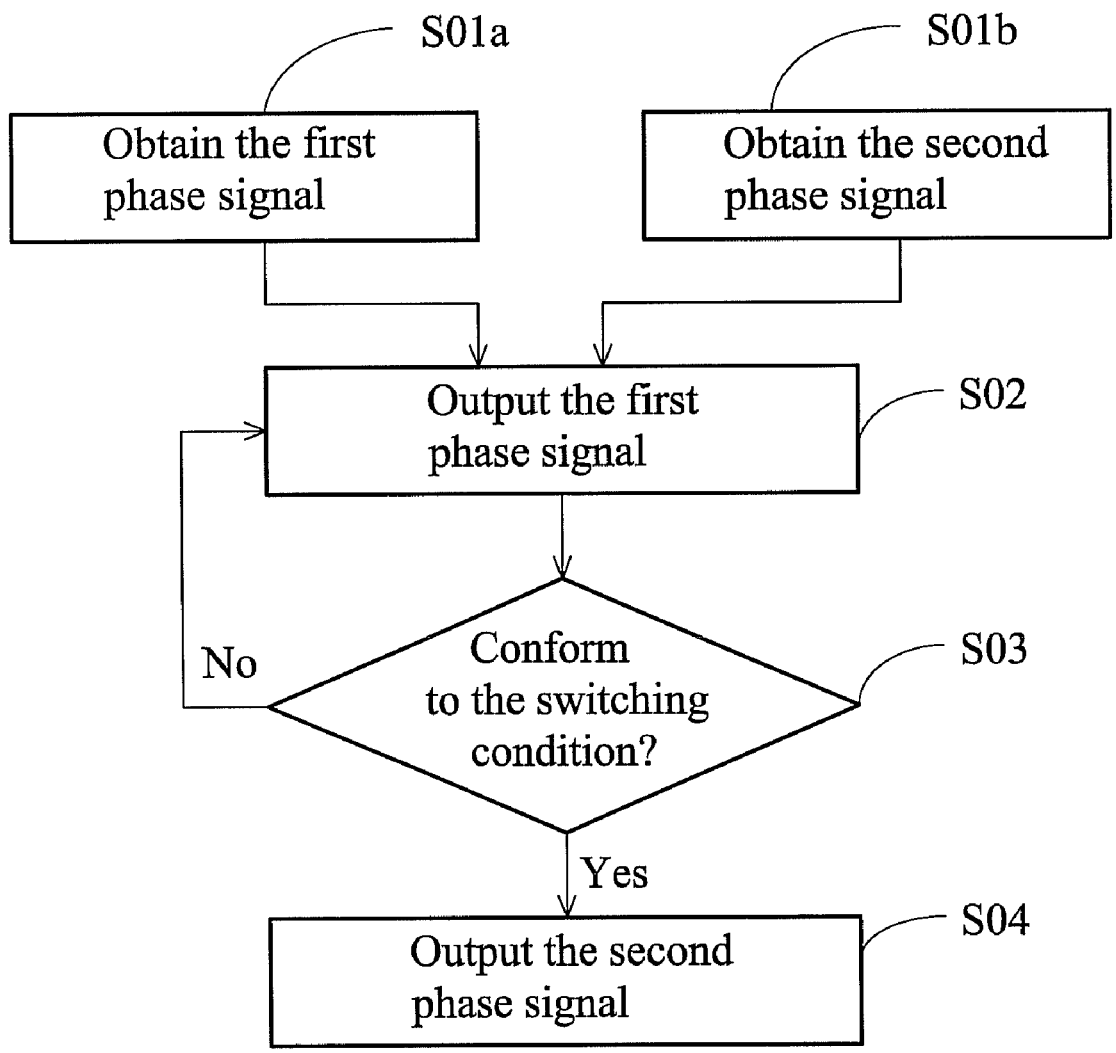
FIG. 8 shows a flow chart of a motor controlling method according to a preferred embodiment of the present invention.

FIG. 8 shows a flow chart of a motor controlling method according to a preferred embodiment of the present invention, wherein the method includes the steps S01a, S01b to S04. The motor controlling device 3 is applied to this method, and illustrates the steps of the controlling method.

In steps S01a and S01b, the first and second sensors 31 and 32 detect the first and second switching phase signals 311 and 321 generated by the motor 4 when the motor 4 starts to operate, respectively.

In step S02, the first sensor 31 is switched and the first switching phase signal 311 is output during an initial operating stage of the motor 4.

In step S03, it is determined whether the predetermined switching condition is satisfied. If no, the first switching phase signal 311 is still output.

In step S04, the second sensor 32 is switched and the second switching phase signal 321 is output to the motor driving circuit 34 when the predetermined switching condition is satisfied.

As described above, the motor controlling device and the motor controlling method thereof mainly dispose two Hall sensors on the circuit board 30 corresponding to an intermediate zone between two silicon steel plates 412 and 413 of the stator 41 of the motor 4. A phase signal (without the operational dead angle) is provided by one of the two Hall sensors to drive the motor during the initial operating stage of the motor 4. Another Hall sensor is switched to output an advanced phase signal (high efficiency) when the motor 4 is operated and the predetermined switching condition is satisfied, such that the motor 4 can give consideration to the motor starting capability and operating efficiency during operation.

While the present invention has been described by way of example and in terms of preferred embodiment, it is to be understood that the present invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A motor controlling device, comprising:
    a first sensor for detecting a switching phase signal generated by a motor and obtaining a first switching phase signal corresponding to the switching phase signal;
    a second sensor for detecting the switching phase signal generated by the motor and obtaining a second switching phase signal corresponding to the switching phase signal; and
    a signal switching circuit electrically connected to the first sensor and the second sensor, respectively, wherein the signal switching circuit comprises:
        a measuring component for measuring after the motor has been started and having a predetermined value, wherein the measuring component outputs a switching signal when an actual value is measured and the measured actual value reaches to the predetermined value; and
        a switch component electrically connected to the measuring component, wherein the switch component is switched from the first sensor to the second sensor after the switch component receives the switching signal, wherein the signal switching circuit is switched to the first sensor for outputting the first switching phase signal when the motor starts to operate, and the signal switching circuit is switched to the second sensor for outputting the second switching phase signal when a predetermined switching condition is satisfied during the motor operation.

2. The motor controlling device as claimed in claim 1, further comprising:
a motor driving circuit electrically connected to the signal switching circuit for receiving the first switching phase signal or the second switching phase signal which is output by the signal switching circuit so as to generate a motor rotating speed controlling signal, and drive the motor to operate according to the motor rotating speed controlling signal.

3. The motor controlling device as claimed in claim 2, further comprising:
a coil switching circuit electrically connected to the motor driving circuit for receiving the motor rotating speed controlling signal output by the motor driving circuit, and switching phases of the motor according to the motor rotating speed controlling signal.

4. The motor controlling device as claimed in claim 2, further comprising:
a PWM generating circuit electrically connected to the motor driving circuit for modulating the first and second switching phase signals received by the motor driving circuit so as to change a rotating speed of the motor.

5. The motor controlling device as claimed in claim 1, wherein the first and second sensors are Hall sensors.

6. The motor controlling device as claimed in claim 1, wherein both the first and second switching phase signals comprise a plurality of continuous and regular square wave signals.

7. The motor controlling device as claimed in claim 1, wherein a phase of the second switching phase signal is in advance of a phase of the first switching phase signal.

8. The motor controlling device as claimed in claim 1, wherein the predetermined switching condition is a predetermined time, rotating speed, rotation number, current or voltage.

9. The motor controlling device as claimed in claim 1, wherein the measuring component is a counter, the predetermined value is a predetermined rotating speed or rotation number, and the actual value is a measured rotating speed or rotation number; or the measuring component is a timer, the predetermined value is a predetermined time, and the actual value is a counted time; or the measuring component is a current/voltage detecting circuit, the predetermined value is a predetermined current/voltage, and the actual value is a measured current/voltage value.

10. The motor controlling device as claimed in claim 1, wherein the first and second sensors are magnetic field sensors, and each of the magnetic field sensors comprises a shunt, current transformer, Hall sensor or magnetic resistor.

11. A motor controlling method, comprising steps of:
obtaining a first switching phase signal by a first sensor to drive a motor to operate when the motor starts to operate;
obtaining a second switching phase signal by a second sensor to drive the motor to operate when a predetermined switching condition is satisfied during the motor operation;
using a measuring component to measure an actual value and output a switching signal when the measured actual value reaches to a predetermined value;
switching a switch component electrically connected to the measuring component, to the first sensor, so as to output the first switching phase signal to the motor when the motor starts to operate; and
switching the switch component from the first sensor to the second sensor in response to the switching signal.

12. The motor controlling method as claimed in claim 11, wherein only one of the first and second switching phase signals is output to drive the motor to operate.

13. The motor controlling method as claimed in claim 11, wherein a phase of the second switching phase signal is in advance of a phase of the first switching phase signal.

14. The motor controlling method as claimed in claim 11, wherein the first switching phase signal is obtained by using the first sensor to detect the motor operation.

15. The motor controlling method as claimed in claim 11, wherein the second switching phase signal is obtained by using the second sensor to detect the motor operation.

16. The motor controlling method as claimed in claim 11, wherein the predetermined switching condition is a predetermined time, rotating speed, rotation number, current or voltage.

17. The motor controlling method as claimed in claim 11, wherein the measuring component is a counter, the predetermined value is a predetermined rotating speed or rotation number, and the actual value is a measured rotating speed or rotation number; or the measuring component is a timer, the predetermined value is a predetermined time, and the actual value is a counted time; or the measuring component is a current/voltage detecting circuit, the predetermined value is a predetermined current/voltage, and the actual value is a measured current/voltage value.

* * * * *